United States Patent [19]

McDaniels

[11] 4,157,198

[45] Jun. 5, 1979

[54] WEED REMOVING TOOL

[76] Inventor: William C. McDaniels, 1400 Cimarron, Hobbs, N. Mex. 88240

[21] Appl. No.: 870,563

[22] Filed: Jan. 18, 1978

[51] Int. Cl.² ................................. A01B 1/18
[52] U.S. Cl. ................................. 294/50.9
[58] Field of Search ............. 294/19 R, 50.5, 50.6, 294/50.8, 50.9, 104; 30/124, 134; 254/132

[56] References Cited

U.S. PATENT DOCUMENTS

| | | | |
|---|---|---|---|
| 267,089 | 11/1882 | Leirmann | 294/83 R UX |
| 332,169 | 12/1885 | Stocking | 294/50.9 |
| 1,061,175 | 5/1913 | Guy et al. | 294/50.9 |
| 1,624,442 | 4/1927 | Stastny | 294/50.9 |
| 2,554,911 | 5/1951 | Kettel | 294/50.9 |
| 3,077,336 | 2/1963 | McClelland | 294/50.9 X |

FOREIGN PATENT DOCUMENTS 179360  9/1935  Switzerland ............... 294/50.8

*Primary Examiner*—Johnny D. Cherry
*Attorney, Agent, or Firm*—Clarence A. O'Brien; Harvey B. Jacobson

[57] ABSTRACT

A weed removing tool having a longitudinally extending member to which a blade is affixed at one longitudinally spaced end thereof, with a rake assembly being pivotally mounted on the member adjacent to and coextensive with the blade. Mounted on the rake assembly is an actuator arrangement disposed for selectively pivoting a rake included in the rake assembly toward and away from the blade in order to selectively engage and grip a weed to be removed in cooperation with the blade. By this arrangement, the blade is first inserted into the ground ajacent a weed to be removed, with the rake being pivoted toward the blade in order to grippingly engage the weed, and the weed subsequently removed by pulling the blade out of the ground.

9 Claims, 4 Drawing Figures

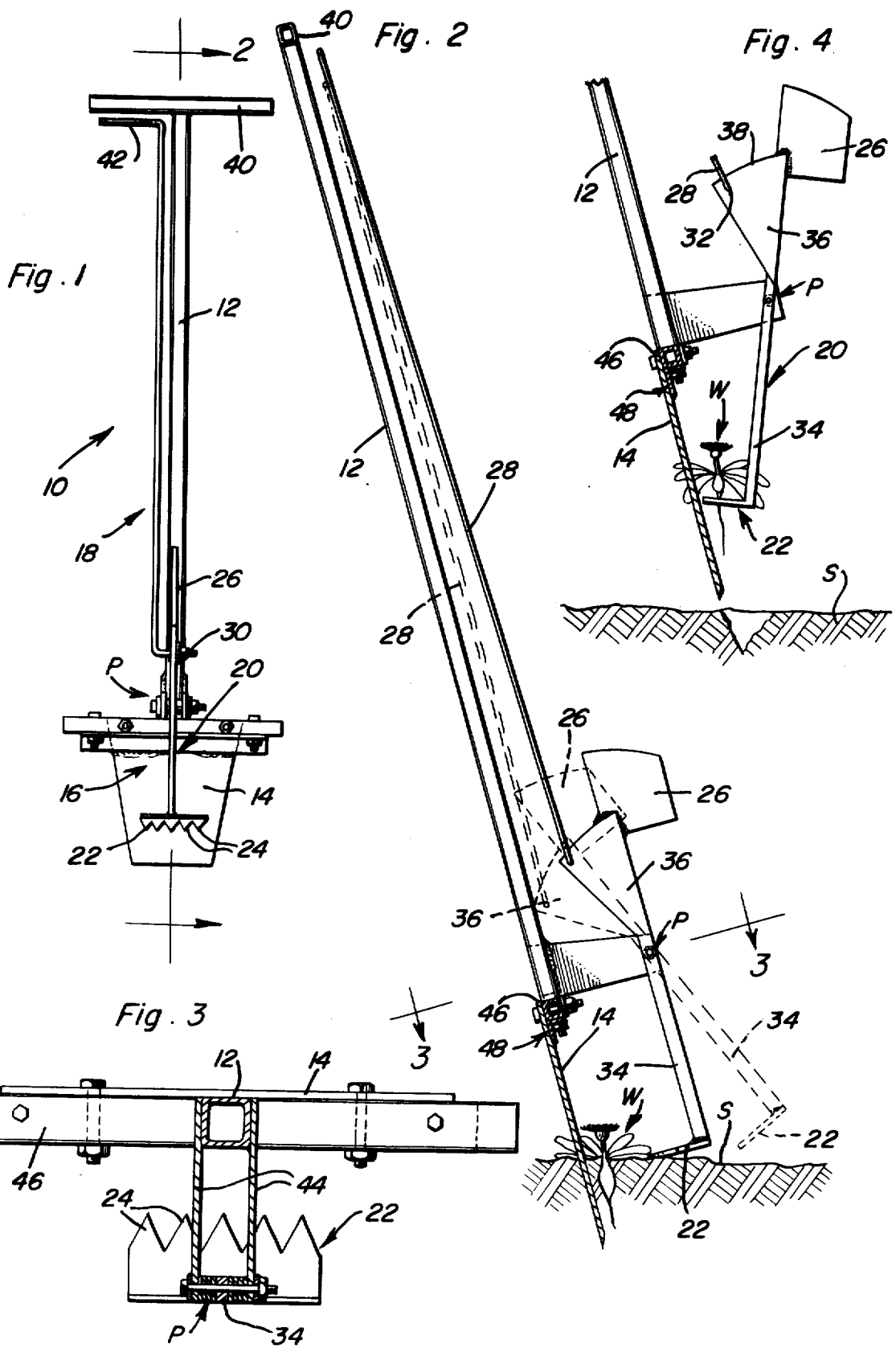

WEED REMOVING TOOL

BACKGROUND OF THE INVENTION

1. Field of the Invention

This invention relates generally to a tool for removing weeds easily from soil and lawns, and particularly to a weed removing tool which takes advantage of foot, leg, arm, and hand strength of an operator to sever the weed root and readily extract the weed body from wet, moist, and dry soil and lawns.

2. Description of the Prior Art

Weed removing tools are generally known which have a rigid digging blade and a movable rake or claw for clamping on the weed, and the like, which is being removed, once the digging blade has been inserted into the ground adjacent the weed or other plant life. Examples of such known tools can be found in prior U.S. Pat. Nos. 905,039, issued Nov. 24, 1908, to H. S. Wimmer; 938,759, issued Nov. 2, 1909, to G. Greene; 917,802, issued Apr. 13, 1909, to B. Schneider; 1,751,481, issued Mar. 25, 1930, to W. J. LaTourrette; 1,903,097, issued Mar. 28, 1933, to R. E. Dunford, et al.; 1,989,932, issued Feb. 5, 1935, to J. M. Junkin; and 3,990,146, issued Nov. 9, 1976, to C. Asselta.

SUMMARY OF THE INVENTION

It is an object of the present invention to provide a weed removing tool which takes advantage of foot, leg, arm, and hand strength to sever a weed root and readily extract a weed body from soil, lawns, and the like.

It is another object of the present invention to provide a weed removing tool which combines into one operation severance of a weed from the root and the extraction of the weed body from the earth without the necessity of the operator stooping to retrieve the weed body.

Yet another object of the present invention is to provide a weed removal tool which is easy to operate and does not require great strength for operation.

A still further object of the present invention is to provide a weed removal tool having fewer operating parts when compared to known tools of the same kind, with a resulting reduction in repair and maintenance costs for the tool.

These and other objects are achieved according to the present invention by providing a weed removing tool having: a longitudinally extending member provided with longitudinally spaced ends; a blade affixed to one of the ends of the longitudinally extending member; a rake assembly pivotally mountd on the member adjacent to and coextensive with the blade; and an actuator arrangement mounted on the rake assembly for selectively pivoting the rake assembly toward and awary from the blade so that the rake assembly will cooperate with the blade to grippingly engage a weed, and the like, being removed.

The rake assembly preferably includes an elongated element having a pair of spaced end portions, with a rake being mounted on one of the end portions so as to be coextensive with, but of shorter length than, the blade, and a counter-weight being mounted on the other of the end portions of the elongated element for normally biasing the rake away from the blade.

The actuator arrangement advantageously includes a longitudinally extending rod having a pair of longitudinally spaced end sections, with the rod being arranged extending substantially parallel to the longitudinal extent of the member on which the blade is mounted. One of the end sections of the rod is pivotally attached to the other of the end portions of the elongated element so as to be adjacent the counter-weight in order to overcome the bias of the counter-weight and cause the rake to pivot toward the blade and to clampingly engage a weed or other plant life in cooperation with the blade.

The elongated element preferably is in the form of a lever creating a pair of oppositely directed arms terminating in the end portions of the element, with a pivot mounting the lever on the longitudinally extending member at a point immediately adjacent the point of attachment of the blade to the member. The rake is mounted on one of the arms, while the other of the arms, that forming the other of the end portions of the element, is triangular in a plane extending perpendicularly from the longitudinally extending member. A base of the triangularly-shaped arm is spaced from the pivot and extends between two corners, or angles, with the rod of the actuator arrangement being attached to the triangularly-shaped arm at one of the corners of the base thereof and disposed closest to the longitudinally extending member, and the counter-weight being affixed to the triangularly-shaped arm at the other of the corners of the base of the arm so that the actuator rod and the counter-weight are operating on the lever from adjacent points terminating the arm which extends in the general direction, but is much shorter than, the longitudinally extending member.

The other of the ends of the longitudinally extending member and the other of the end sections of the rod terminate in respective handles normally disposed adjacent one another, with the longitudinal extent of the member being greater than the longitudinal extent of the rod. In addition, the extent of the blade away from the point of attachment thereof to the longitudinally extending member is substantially greater than the extent of the one of the arms on which the rake is mounted so as to permit the blade to be inserted into the earth a distance sufficient to sever the roots of a weed, and the like, being removed without causing the rake to come into engagement with the surface of the earth and be prevented from pivoting in such a manner as to cooperate with the blades to quickly engage the body of the weed.

The blade advantageously is substantially trapezoidal in plan in a plane substantially parallel to a pivot axis of the lever, with the rake having a plurality of sharp teeth extending generally perpendicularly to the plane of the blade for selectively engaging a weed to be removed and gripping the weed in cooperation with the blade. The blade itself is advantageously mounted on a length of tubing arranged extending transversely to the extent of the longitudinally extending member in order to provide a pair of steps on which an operator may place a foot to facilitate insertion of the blade into the soil, lawn, and the like, from which a weed or other undesirable plant life is to be removed.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a front elevational view showing a weed removal tool according to the present invention.

FIG. 2 is an enlarged, fragmentary, sectional view taken generally along the line 2—2 of FIG. 1.

FIG. 3 is an enlarged, sectional view taken generally along the line 3—3 of FIG. 2.

FIG. 4 is a fragmentary, sectional view, similar to FIG. 2, but showing the weed removing tool according to the invention in a different stage of a weed removing cycle than is seen in FIG. 2.

DESCRIPTION OF THE PREFERRED EMBODIMENTS

Referring now more particularly to the figures of the drawing, a weed removing tool 10 according to the present invention includes a longitudinally extending member 12 having a pair of spaced ends, with a blade 14 being affixed to one of the ends of member 12. A rake assembly 16 is pivotally mounted on member 12 adjacent to and extending in the same direction as the blade. Mounted on rake assembly 16 for selectively pivoting same toward and away from blade 14 is an actuator 18.

Rake assembly 16 includes an elongated element 20 having spaced end portions, with a rake 22 being mounted on one of the end portions of element 20. This rake 22 has a plurality of sharp teeth 24 extending generally perpendicularly to a plane in which lies the blade 14 for selectively engaging a weed W to be removed from soil S and gripping the weed in cooperation with blade 14. A counter-weight 26 is mounted on the other of the end portion of element 20 for normally biasing, under the influence of gravity, rake 22 away from blade 14.

Actuator 18 includes a longitudinally extending rod 28 having a pair of longitudinally spaced end sections, with rod 28 being arranged extending in the general direction of longitudinally extending member 12. End section 30 of rod 28 is bent at right angles to the over-all extent of rod 28 so as to be pivotally attached to the other of the end portions of the elongated element 20 adjacent to the attachment of counter-weight 26 to element 20. The attachment of end section 30 of rod 28 can be effected as by the provision of a hole 32 in element 20, with a suitable collar being mounted on the end section 30 to retain same in the hole 32.

Element 20 is in the form of the illustrated lever forming a pair of oppositely directed arms 34 and 36 terminating in the aforementioned end portions of element 20. A pivot P mounts, in a conventional manner, the lever on the longitudinally extending member 12 for movement about a pivot axis spaced from member 12 and disposed transverse to the extent of the member 12. Arm 34 has rake 22 affixed thereto, while the arm 36 is triangular in a plane extending perpendicularly from the longitudinally extending member 12. A base 38 of the triangularly-shaped arm 36 is spaced from the pivot P and extends between two corners, or angles, of the triangle with the end section 30 of rod 28 being pivotally attached to arm 36 at one of the corners of base 38, which corner is disposed closest to the longitudinally extending member 12. Counter-weight 26 is affixed to arm 36 at the other of the corners of the base 38 so as to be mounted on element 20 at approximately the same moment arm with respect to pivot P, but spaced slightly from hole 32 so as to form a moment arm between counter-weight 26 and end section 30 of rod 28.

The other of the ends of member 12 and the other of the end sections of rod 28 terminate in respective handles 40 and 42, with the longitudinal extent of member 12 being greater than the longitudinal extent of rod 28 so as to permit handle 42 to be arrangeable adjacent to one side of handle 40 in order to permit an operator (not shown) to retain a hand on both handle 40 and handle 42 simultaneously.

A pair of spaced, substantially parallel, coextensive brackets 44 extend from the one end of member 12 in order to pivotally mount lever or element 20 on member 12 while a length of tubing 46 is affixed to the one end of member 12 adjacent brackets 44 and disposed extending transversely to the longitudinal extent of member 12 for forming foot steps for an operator of the tool. Further, the blade 14, which is substantially trapezoidal in plan and lies in a plane substantially parallel to the pivot axis of element 20, is affixed to the tubing 46 for indirect mounting on member 12. A length of angle 48 is bolted or otherwise attached to tubing 46 so as to reinforce the mounting line of blade 14 on tubing 46.

In operation, the front, or smaller base, edge of blade 14 is placed near the center of a weed W, and a foot of the operator pushes on one side of the tubing 46 in order to insert blade 14 into soil S and sever roots of weed W. Next, the operating rod 28, which normally lies free in order to complement the counter-weight 26 and keep rake 27 in the position seen in broken lines in FIG. 2 is pulled toward handle 40. As the handle 42 of rod 28 is pulled toward handle 40, element 20 will pivot around axis P through the point seen in full lines in FIG. 2 to the position seen in FIG. 4. By this action, the weed W will be firmly gripped between rake 22 and blade 14, permitting the weed W to be extracted from the earth by withdrawing blade 14 from soil S by a upward, or backward, movement of handle 40 by the operator. Thus, in a simple manner, weeds can be extracted without requiring great strength and back-bending on the part of the operator.

As can be readily understood from the above description and from the drawing, a weed removal tool according to the present invention permits weeds to be removed in a simple and easy manner by a person not having great strength without undue physical strain on the person. Further, the tool includes a minimum of moving parts, and does not require the use of springs or positive-acting biasing elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimd as new is as follows:

1. A weed removing tool comprising an elongated shaft having a pair of spaced ends; a handle attached at one of said ends; a blade affixed to the other of said ends, said blade being in substantial alignment with said shaft; a rake mounting means extending normally from said shaft; a rake means pivotally mounted on said rake mounting means, said rake means having one end thereof extending alongside said blade for cooperation with said blade upon pivoting of said rake means on said rake mounting means; said rake means further including an opposite end having a near side and a far side, said far side being spaced from said shaft and said near side being positioned between said far side and said shaft; a counterweight fixedly attached to said far side; and an elongated activation element pivotally attached to said near side for causing pivotal motion of said blade means upon the imparting of a force thereto.

2. The device of claim 1 wherein said rake means further includes a transversely extending rake element having a plurality of teeth for engaging said blade upon pivoting of said rake means.

3. The device of claim 2 wherein said rake means opposite end is configured generally as a rectangle with said rectangle lying in a plane normal to the plane of said blade.

4. A weed removing tool, comprising, in combination:
(a) a longitudinally extending member having longitudinally spaced ends;
(b) a blade affixed to the longitudinally extending member at one of the ends thereof;
(c) rake means pivotally mounted on the member adjacent to and extending in the same direction as the blade for selectively cooperating with the blade to grip an object being removed including, in combination:
  (1) an elongated element having spaced end portions;
  (2) a rake mounted on one of the end portions; and
  (3) a counter-weight mounted on the other of the end portions of the elongated element for biasing the rake away from the blade;
(d) actuator means mounted on the rake means for selectively pivoting the rake means toward and away from the blade including a longitudinally extending rod having a pair of longitudinally spaced end sections, with the rod being arranged extending generally in the same direction as the longitudinal extent of the longitudinally extending member, one of the end sections of the rod being pivotally attached to the other of the end portions of the elongated element adjacent to but spaced from the point of attachment of the counter-weight to the same other of the end portions of the elongated element for forming a moment arm between the counter-weight and the point of attachment of the rod; and wherein the elongated element is a lever forming a pair of oppositely directed arms terminating in the end portions of the element, a pivot mounting the lever on the longitudinally extending member for pivotal movement about a pivot axis transverse to the longitudinal extent of the member, a one of the arms having the rake affixed thereto, and the other of the arms terminating in the other of the end portions being triangular in a plane extending perpendicularly from the longitudinally extending member, a base of the triangularly-shaped arm being spaced from the pivot axis and extending between two corners, with the rod being attached to the triangularly-shaped arm at one of the corners of the base disposed closest to the longitudinally extending member and the counter-weight being affixed to the triangularly-shaped arm at the other of the corners of the base thereof.

5. A structure as defined in claim 4, wherein the other of the ends of the longitudinally extending member and the other of the end sections of the rod terminate in respective handles, the longitudinal extent of the member being greater than the longitudinal extent of the rod.

6. A structure as defined in claim 4, wherein the blade is substantially trapezoidal in plan and lies in a plane substantially parallel to the pivot axis of the lever, the rake having a plurality of sharp teeth extending generally perpendicularly to the plane of the blade for selectively engaging an object to be removed and gripping the object in cooperation with the blade.

7. A structure as defined in claim 6, wherein the other of the ends of the longitudinally extending member and the other of the end sections of the rod terminate in respective handles, the longitudinal extent of the member being greater than the longitudinal extent of the rod.

8. A structure as defined in claim 7, wherein the blade has a greater extent than the one of the arms on which the rake is mounted for permitting the blade to be inserted into soil a distance sufficient to sever the roots of a weed to be removed by the tool without causing the rake to engage the surface of the soil.

9. A structure as defined in claim 4, wherein the blade extends a greater distance than the rake means relative thereto for permitting the blade to be inserted into soil a distance sufficient to sever roots of a weed being removed by the tool, without the rake means coming into engagement with the soil, and wherein the longitudinally extending member has mounted transversely thereon a length of tubing for forming foot engaging steps facilitating insertion of the blade into the soil.

* * * * *